UNITED STATES PATENT OFFICE.

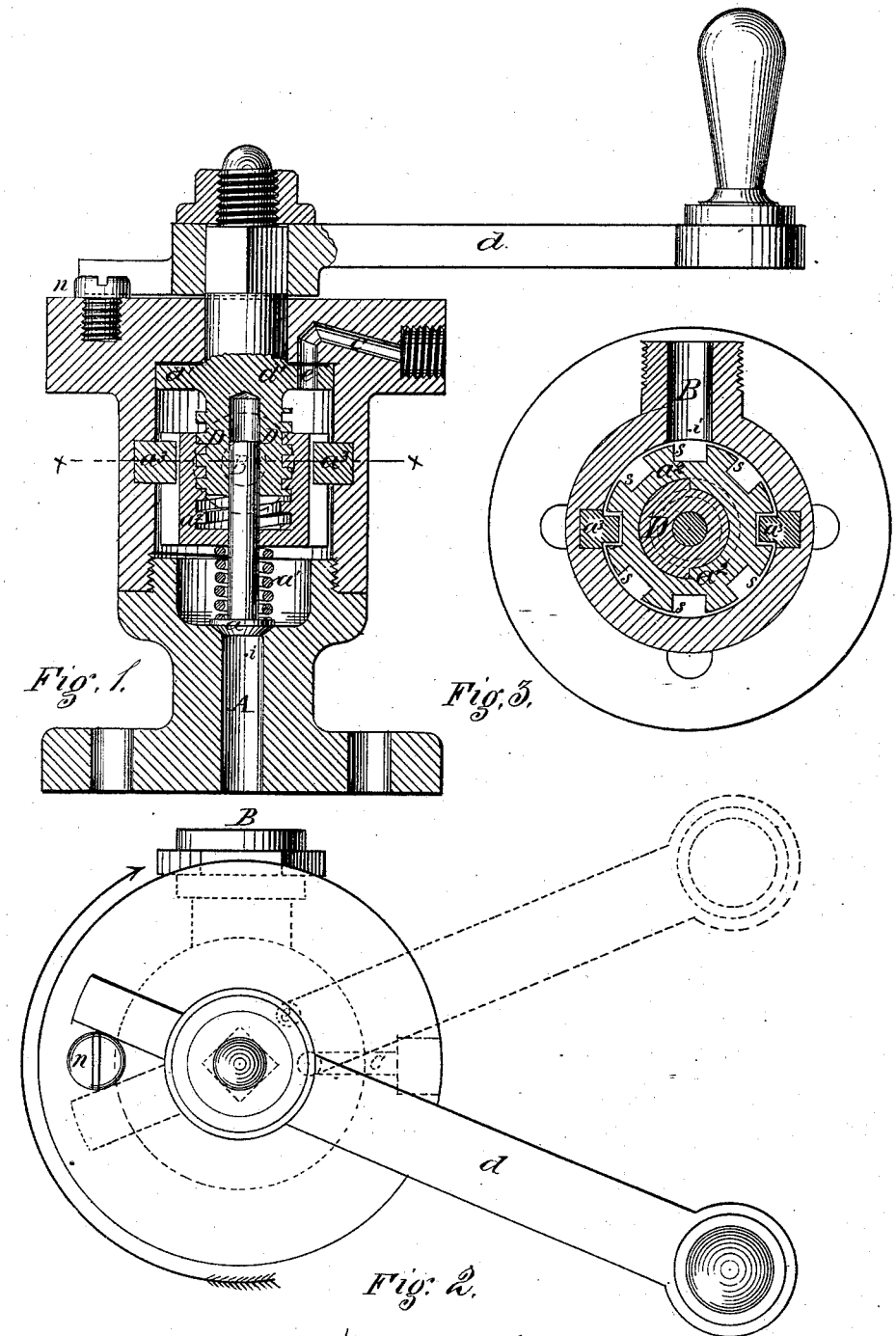

GEORGE WESTINGHOUSE, JR., OF PITTSBURG, PENNSYLVANIA.

IMPROVEMENT IN OPERATING-VALVES FOR STEAM AND AIR BRAKES.

Specification forming part of Letters Patent No. 216,545, dated June 17, 1879; application filed May 7, 1879.

*To all whom it may concern:*

Be it known that I, GEORGE WESTINGHOUSE, Jr., of Pittsburg, county of Allegheny, State of Pennsylvania, have invented or discovered a new and useful Improvement in Operating-Valves for Steam and Air Brakes; and I do hereby declare the following to be a full, clear, concise, and exact description thereof, reference being had to the accompanying drawings, making a part of this specification, in which—like letters indicating like parts—

Figure 1 is a vertical sectional view of my improved device. Fig. 2 is a top or plan view thereof, and Fig. 3 is a transverse horizontal section through $x\,x$ of Fig. 1.

In connection with power-brake mechanism, particularly on locomotives and tenders, it is or may be sometimes preferred to work the brakes by steam instead of compressed air or vacuum.

My present improvement, while usable in applying and releasing air-pressure, is particularly designed as a steam-valve in such use in connection with such brake apparatus.

In this construction the port A has a boiler-connection, so as to receive steam therefrom. B is a side port leading to the brake cylinder or cylinders, and C is an opening to the outer air. The port A is closed by a valve, $a$, pressed down to its seat by a spring, $a^1$, on which bears an internally screw-threaded socket, $a^2$. This socket is ribbed externally in the direction of its length, and held in place as against a rotary motion by means of studs $a^3$, which project inwardly into the spaces between the ribs $s$ of $a^2$, though any tongue-and-groove or key-and-feather connection may be used instead. Within the socket works a screw-threaded stem, D, which can be turned on its axis by the use of a handle, $d$. On this stem is a disk, $d'$, which works as a rotary slide-valve in covering or uncovering the outlet port or passage C. When it is desired to apply the brakes, the handle $d$ is turned in the direction of the arrow, Fig. 2, so that the stem D raises the socket $a^2$, thereby relieving the spring $a^1$ to such extent as to permit the valve $a$ to open, so that steam passes from A to B, and thence to the brake cylinder or cylinders, exerting therein a pressure depending upon the extent to which the spring $a^1$ is relieved by turning the handle $d$. This variable element of operation may be utilized to a greater or less degree by corresponding variations in the length of the motion of the handle, or by making the screw-threads of a greater or less pitch, or the spring $a^1$ of a greater or less degree of compressibility. The turning of the handle also effects the turning of the slide-valve $d'$, so as to close the escape-port C. When the brakes are to be released the handle $d$ is turned back, causing the spring $a^1$ to be compressed, so as to close the valve $a$. Also, the escape-port C is uncovered by a port, $e$, in the disk-valve $d'$ being brought by the same motion into line therewith, whereby the steam from the brake-cylinder is allowed to escape, so as to release the brakes.

If desired, one or more stops, $n$, are added, to limit properly one or more of the movements of the handle $d$.

The socket $a^2$ is made, by preference, with several ribs, $s$, on its periphery, so that it can be turned more or less around before engaging it with the studs $a^3$, for the purpose of adjusting the pressure of the spring $a^1$.

A small hole, $i$, is drilled through the valve-shell from A to B, constantly open to admit sufficient steam to the brake-cylinder to make up for condensation or other loss of pressure; but other suitable leak may be provided between these two ports instead of the one thus designated, or other leakage may be provided for by like means.

I claim herein as my invention—

1. A valve-case containing a rotary ported disk-valve to close and open the escape, a free or open port leading to a brake-cylinder, and a steam-boiler port opened and closed by a puppet-valve, substantially as set forth.

2. A rotary-disk slide-valve, $d'$, having an externally-threaded stem, in combination with a non-rotating but vertically-moving socket, $a^2$, threaded internally, and a spring-valve, $a$, substantially as set forth.

In testimony whereof I have hereunto set my hand.

GEO. WESTINGHOUSE, JR.

Witnesses:
 CHAS. BERKLEY HARRIS,
 JOHN DEAN,
  17 *Gracechurch Street, London.*